United States Patent
Keller et al.

(10) Patent No.: US 8,123,047 B2
(45) Date of Patent: Feb. 28, 2012

(54) FILTER FOR FLUIDS IN CONDUITS

(75) Inventors: Guido Keller, Hagen (DE); Dirk Trostmann, Wetter (DE)

(73) Assignee: Taprogge GmbH, Wetter (DE)

( * ) Notice: Subject to any disclaimer, the term of this patent is extended or adjusted under 35 U.S.C. 154(b) by 134 days.

(21) Appl. No.: 12/443,200

(22) PCT Filed: Jan. 11, 2007

(86) PCT No.: PCT/EP2007/000207
§ 371 (c)(1),
(2), (4) Date: Mar. 27, 2009

(87) PCT Pub. No.: WO2008/083713
PCT Pub. Date: Jul. 17, 2008

(65) Prior Publication Data
US 2009/0321345 A1  Dec. 31, 2009

(51) Int. Cl.
*B01D 33/27* (2006.01)
*B01D 33/50* (2006.01)
*B01D 33/76* (2006.01)
*B01D 35/02* (2006.01)

(52) U.S. Cl. ............ 210/411; 210/333.1; 210/391; 210/393; 210/446; 210/398

(58) Field of Classification Search ............ 210/411, 210/333.1, 391, 393, 446, 397, 398
See application file for complete search history.

(56) References Cited

U.S. PATENT DOCUMENTS

| 3,140,995 A | * | 7/1964 | Kinney | 210/393 |
| 3,622,006 A | * | 11/1971 | Brunner | 210/355 |
| 4,814,076 A | | 3/1989 | Jackson | |
| 4,904,397 A | | 2/1990 | Eimer et al. | |
| 5,217,512 A | | 6/1993 | Williams | |
| 5,275,728 A | | 1/1994 | Koller | |
| 5,598,889 A | | 2/1997 | Jackson | |
| 5,975,311 A | | 11/1999 | Jackson | |
| 7,510,073 B2 | | 3/2009 | Kanaris | |
| 2005/0109585 A1 | | 5/2005 | Kanaris | |

FOREIGN PATENT DOCUMENTS

| DE | 41 03 514 C1 | | 11/1992 |
| DE | 295 10 217 U1 | | 9/1995 |
| EP | 0 268 752 A1 | | 6/1988 |
| EP | 0 897 096 A1 | | 2/1999 |
| FR | 2 609 644 A1 | | 7/1988 |
| FR | 2 716 530 A1 | | 8/1995 |
| JP | 10080609 A | * | 3/1998 |
| WO | 2005/051809 A1 | | 6/2005 |

* cited by examiner

Primary Examiner — Thomas M Lithgow
(74) Attorney, Agent, or Firm — Bachman & LaPointe, P.C.

(57) ABSTRACT

The invention relates to a filter for fluids in conduits, consisting of: a tubular filter housing (1); a filtering basket (9) that is coaxial with the filter housing (1) and that is positioned to rotate; a stationary flushing connection (16) for removing substances that have been retained by the filtering basket (9), said connection covering successive parts of the filtering basket (9) and being connected to means for removing the substances. To achieve a simple construction for the filter, increased operational safety for the drive components and the rotational mounting of the filtering basket (9), in conjunction with reduced production and maintenance costs, a fluid-proof drum motor (3) is coaxial with the filter housing (1) and the filtering basket (9) is fixed to the drum (4) of said motor.

12 Claims, 3 Drawing Sheets

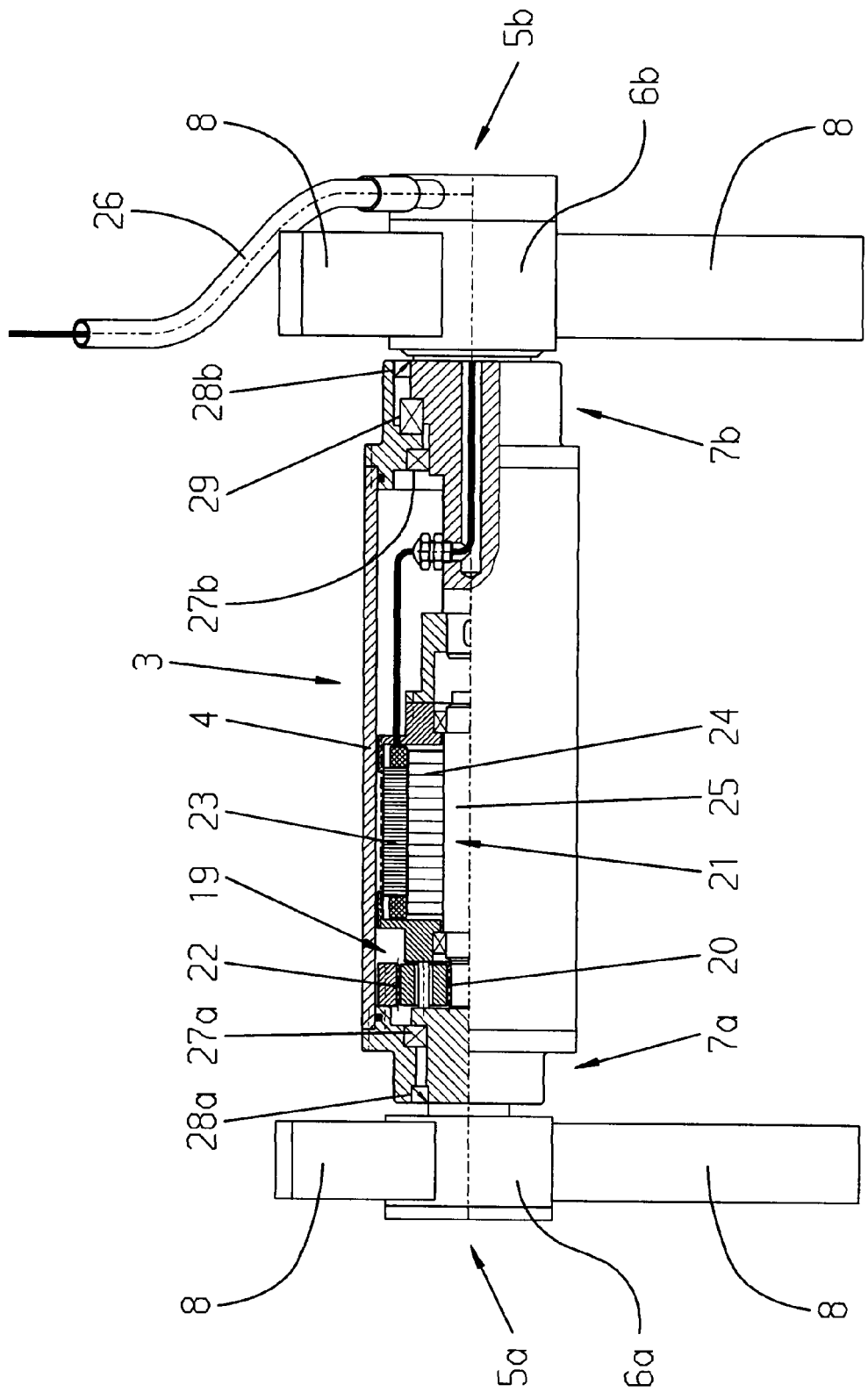

FILTER FOR FLUIDS IN CONDUITS

BACKGROUND OF THE INVENTION

The present invention relates to filters for fluids in conduits, comprising
  a tubular filter housing,
  a filter basket coaxially and rotatably arranged in the filter housing
  and a stationary flushing pipe piece for removing substances that have been retained by the filter basket,
  said piece subsequently covering parts of the filter basket, and
  being connected to means for removing these substances.

Filters of this type are well known from FR 2 609 644. They are primarily for cleaning the cooling water for heat exchangers, such as in power stations, and are there inserted in the cooling water supply.

The well known filter has a filter basket with a screen surface extending across the free cross section of the filter housing and functions according to the so-called backflushing principle. Radial separating webs on the screen surface form filter chambers as parts of the filter basket. The filter basket is attached on a concentric shaft rotatably supported by a hub held by radial spokes. The filter basket is driven by a motorized rotary drive arranged on the outside of the filter housing, the drive pinion of which runs in mesh with outer toothing of the filter basket. The flushing pipe piece is arranged in a stationary position on the upstream side directly at the open side of the filter chambers and connected to a suction conduit through the side wall of the filter housing. If a suction is created in the flushing pipe piece via this conduit and applied from there to the filter chamber which is currently covered by the flushing pipe piece, substances retained in the filter basket in this filter chamber, such as dirt or the like, are released from the filter chamber and removed to the outside by the flushing pipe piece through the suction conduit. The suction conduit is periodically operated or depending on the amount of dirt in the filter chambers. The filter basket is caused to rotate by the rotary drive so that one filter chamber after the other is exposed to the suction effect of the flushing pipe piece and thus cleaned.

A similar filter is known from FR 2 716 530, wherein a filter basket with a screen surface and with a subdivision in filter chambers is coaxially and rotatably arranged also in a filter housing. The filter is arranged at the cooling water outlet of heat exchangers. It is used to catch in the filter chambers cleaning bodies having circulated through the conduits of a heat exchanger, and removed from there by the application of the backflushing principle. Again, the rotary drive of the filter basket is by an outer toothing on the filter basket running in mesh with a pinion of a gearbox driven by an external electric motor. A pipe piece is arranged on each side, upstream and downstream, on this filter basket. The two pipe pieces cooperate. Cooling water is introduced into the downstream pipe piece under pressure, which passes through the screen surface of each filter chamber covered by the pipe piece for removing the cleaning bodies retained there and caused to exit via the upstream pipe piece and an exit conduit connected thereto.

A further filter of this type having a backflushing system is known from EP 0 897 096 B1, which is both for cleaning cooling water and for catching cleaning bodies from the cooling water flow. For this purpose, again, a filter basket with a screen surface is coaxially supported within a tubular filter housing and can be rotatably driven there. The rotary drive also consists of an outer toothing on a filter basket running in mesh with a drive pinion rotatably supported in a boss of the filter housing and driven by a motor arranged outside of the filter housing. In the exemplary embodiment of this document, the housing of this filter arranged on the cooling water outlet of a heat exchanger has a pressurized-water supply line on the downstream side of the filter basket and a flush-out conduit for flushing water on the upstream side above the filter basket. Also in this case, filter chambers are formed by radial separating webs on the upstream side on the screen surface of the filter basket. On the downstream side of the filter basket, connected to the pressurized water supply conduit, there is a pressurized pipe piece which is faced by a segment-shaped plate on the upstream side above the filter chambers, for forming a flow-free space in that filter chamber which is currently between the pressurized pipe piece and the plate. By opening the pressurized water supply, pressurized water flows through the section of the screen surface lying above the pressurized pipe piece and through the filter chamber arranged here, carries away the cleaning bodies caught in the filter chamber and exits together with them via the flush-out conduit.

Irrespective of whether the described backflushing principle is used in filters upstream of the cooling water inlet of heat exchangers for cleaning cooling water of dirt particles or the like, or for catching and removing cleaning bodies at the cooling water outlet of a heat exchanger, the force transmission for the rotary drive of the filter basket is always carried out by means of a toothed rim on the circumference of the filter basket within the filter housing. A pinion driven by an external motor is in mesh with the toothed rim. Depending on the structure, either the drive shaft of the motor passing through the filter housing or the gear box arranged within the filter housing have to be made fluid-proof. The manufacture and maintenance of this driving system for the filter basket are very bothersome.

A further drawback of this drive system is its lack of operation safety. Due to the axial and radial stresses acting on the screen surface and the filter basket due to the cooling water flow in combination with the rotary movement, the tolerances of the rotary bearing and the rotary drive of the filter basket are very difficult to control. Therefore, the rotary drive and rotary bearing of the filter basket are extremely prone to failure. Moreover, the motor of the well-known filters needs structural space and protection outside of the filter housing. The overhead for operational checks and for maintenance and repair of systems of this type is therefore high.

An alternative to this filter structure is shown in EP 0 268 752 B1, wherein a rotatably supported suction shoe as a flushing pipe piece rotates below a fixed filter basket with filter chambers on the upstream side. The motor for the rotary drive of the suction shoe can optionally be arranged within the filter housing or outside of it.

SUMMARY OF THE INVENTION

It is therefore the object to simplify the structure of the filter, to safely control the operational safety of the drive components and the rotary support of the filter basket and to reduce the costs for manufacture and maintenance of the filter.

This object is solved on the basis of a filter of the initially mentioned type by
  arranging a fluid-proof drum motor coaxially in the filter housing,
  with the filter basket fixed to its drum.

As explained above, the filter according to the present invention makes it possible to do without the failure-prone rotary drive of the filter basket and its unsafe rotary support in prior-art filter systems. Instead, the two functions, i.e. rotary support and rotary drive of the filter basket are taken over by a centrally arranged new component. The reason for this is that, according to the present invention, as a rotary drive of the filter basket, a fluid-proof drum motor is coaxially arranged in the filter housing and carries the filter basket on the outside of its drum.

By the simplification of the rotary drive system for the filter basket, the operational safety of the filter is substantially increased, and at the same time the maintenance overhead is substantially reduced as a subsequent advantage.

The backflushing principle for removing substances retained on the filter basket out of the filter remains the same in the simplified structure of the filter according to the present invention, as well as the flushing pipe piece arranged in a stationary manner. A stationary flushing pipe piece affords a simple structure of the flush-out conduit connected to the flushing pipe piece and extending through the filter housing to the outside.

Preferably, the portions of the filter basket subsequently covered by the flushing pipe piece consist of filter chambers formed by webs on the filter surface, suitably a screen surface, or of screen segments in the filter chambers. The flushing pipe piece should preferably cover the filter chamber so that the flushing pressure has the most intensive possible effect on each filter chamber.

During backflushing, the filter basket is continuously rotated, periodically rotated or rotated depending on the amount of dirt in the filter chambers for sucking away or otherwise flushing the substances caught in the filter chambers, while the flushing pipe piece is responsible for sucking off or flushing out the substances from the filter chambers.

The filter basket carried by the drum motor can also be of a plurality of filter elements attached on the drum of the drum motor, or may comprise a number of filter elements, such as filter candles, which are suitably successively flushed for removing accumulated substances.

As will be explained in the following, the drum motor allows simple fixing of its ends on the inner wall of the filter housing each by means of a hub with radial struts at a distance upstream and downstream from the filter basket. The drum motor does not form an obstruction for the water flow through the filter. This is because the flow resistance of the drum motor is very small due to the small diameter of the drum. The filter basket may be simply attached on the drum of the drum motor, such as by means of a pipe piece welded on the drum or fitted over the latter with an axial securing means, and from which struts extend to the annular side wall of the filter basket. The struts can be formed as separating webs for forming the filter chambers and thus fulfill two functions.

The fixed installation of the flushing pipe piece allows the use of a short pipe piece for covering the distance from the flushing pipe piece to a suction valve on the outside of the filter housing for removing substances, such as dirt particles, retained in the filter.

The drum motor used for the filter in the manner according to the present invention is used, as far as its basic structure is concerned, as conventionally for the drive of rollers for belt conveyor systems. A drum motor suitable for adaptation to the requirements of a rotary drive of filter baskets, is known, for example, from WO 2005/051809 entitled "A Motorized Drum Roller with Fixed Ends". For this reason the invention does not require the development of a completely new motor structure, but prior-art drum motors can be used, which, however, must be adapted to the substantially different purpose as a carrier and rotary drive of a filter basket in a filter for fluids in conduits.

Preferably, the ends of the drum motor are fixed in fixtures, as already mentioned, fixedly connected with the filter housing by means of radial struts. To receive both ends of the drum motor, simple hub supports or pieces are suitable, for example. One of the radial struts can accommodate the cable conduit for the drum motor.

According to the present invention, the drum motor is fluid-proof and preferably media-resistant. Suitably, fluid-proof gaskets are arranged on the end sections of the drum motor. Moreover, the sense of rotation of the drum motor should be reversible at any time, in particular if an obstruction blocks the full rotation of the filter basket.

Another adaptation to the purposes of the present invention is that the drum motor has an axial bearing between the drum and at least one of the fixed end sections adjacent to the rotary bearings.

It cannot be excluded that large debris, such as parts of tree branches or the like, are retained by the filter basket from the cooling water flow in the operation of the filter, which block the rotary movement of the filter basket, if they get caught between the filter basket and the flushing pipe piece. According to an inventive further development, control of the drum motor is provided for reversing the sense of rotation of the drum motor and the filter basket if the rotation of the filter basket is blocked by an obstruction in one sense of rotation. By the reversibility of the rotary motion of the filter basket achieved thereby, the filter basket continues its rotary motion in the reverse direction, so that the suction removal from the filter chambers is continued through the flushing pipe piece despite the obstruction.

Generally speaking, if the backflushing principle for removing deposits cannot be applied, a preferably stationary clearing element of a different type can be used to remove deposits from the screen surface of the filter basket. The present invention is thus not limited to the application of the backflushing principle for removing caught substances, but basically resides in the new principle of arranging a fluid-proof drum motor coaxially in a tubular filter housing and fixing a filter surface, such as a screen surface, covering the free cross section of the filter housing on the drum of the motor.

The filter according to the present invention is primarily intended for cleaning fluids, such as cooling water of substances, such as dirt particulate. For this purpose, it can be arranged, for example, in the cooling water supply conduit of heat exchangers. With a corresponding structural adaptation, however, it can also be used for catching and removing cleaning bodies, with which the tubes of heat exchangers are cleaned, and arranged for this purpose at the outlet of the cooling water flow of heat exchangers.

For this purpose, a pipe piece connected to a pressurized-water conduit extending through the filter housing can be arranged on the filter basket also downstream of it, which is faced by a second pipe piece on the filter basket on the upstream side, connected to an outlet extending through the filter housing to the outside. Instead of the second pipe piece, however, the filter chambers, if any, can successively be brought into fluid connection directly with the outlet.

BRIEF DESCRIPTION OF THE DRAWINGS

The invention will be explained in more detail in the following with reference to an exemplary embodiment with reference to the accompanying drawings. In the drawings:

FIG. 3 shows a view of a drum motor of the filter of FIGS. 1 and 2 in a longitudinal sectional view.

DETAILED DESCRIPTION

Figure 1:
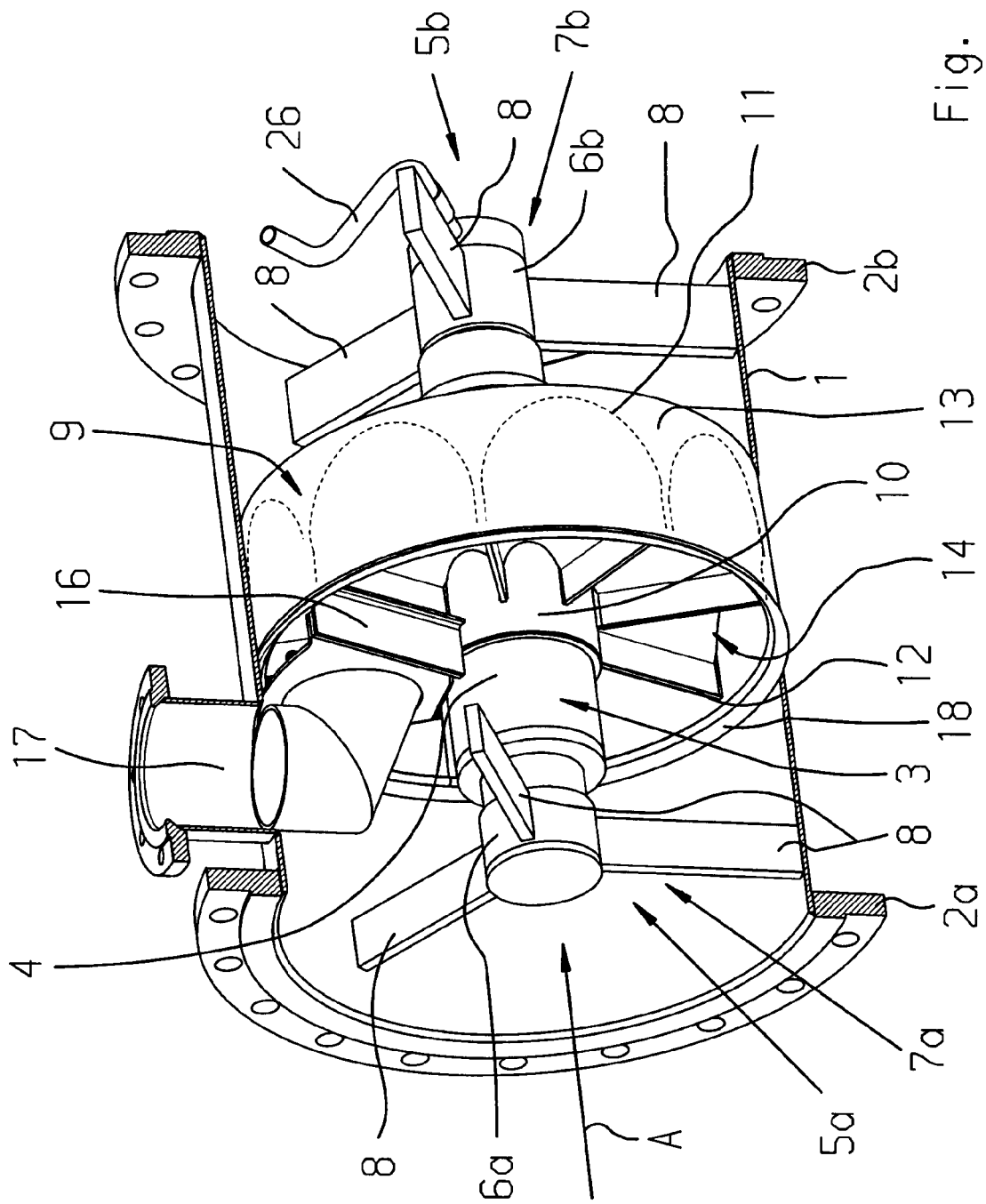
FIG. 1 shows a perspective side view of a filter, with a portion of the side wall of the filter housing cut away for clarity.
Figure 2:
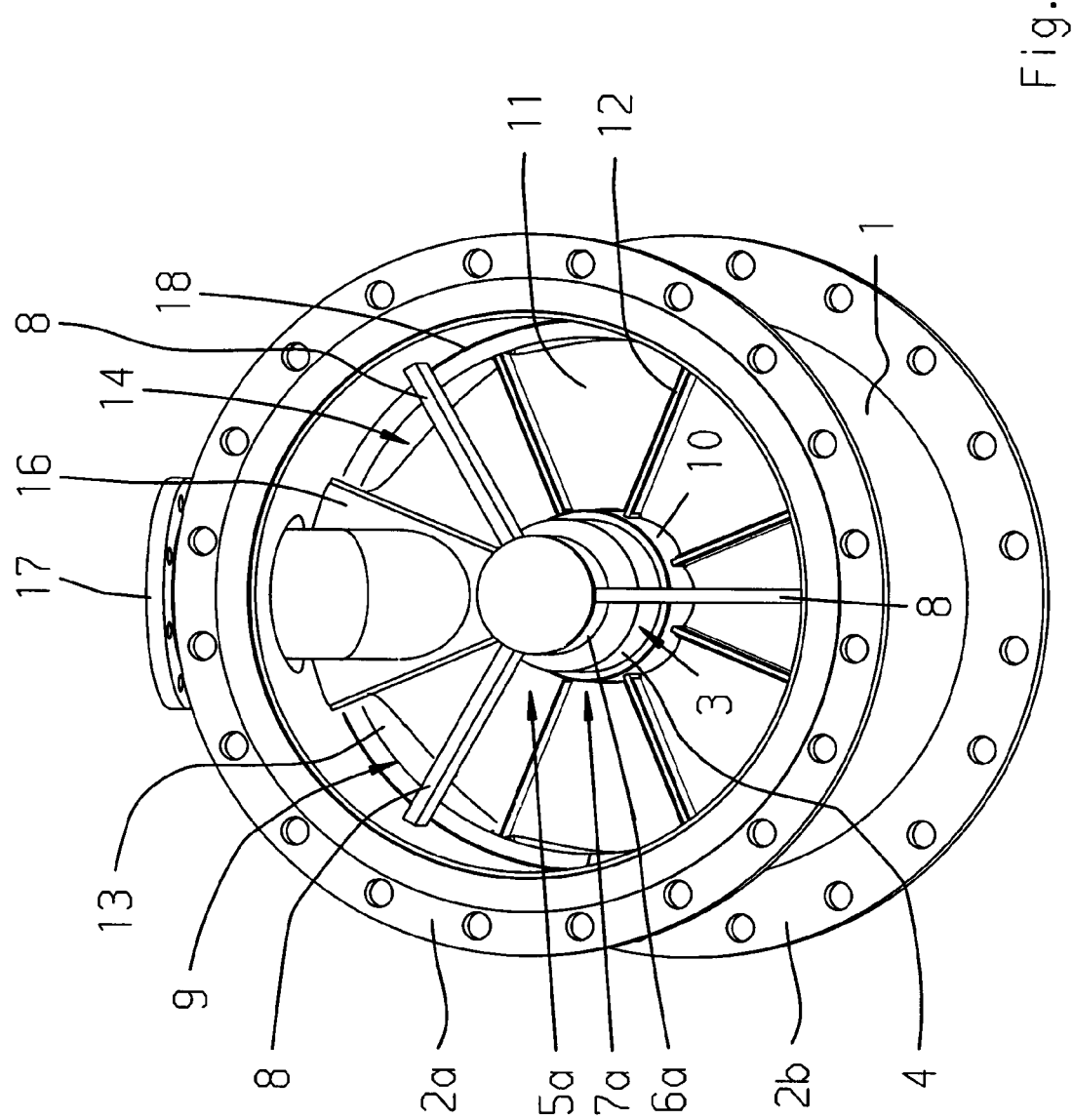
FIG. 2 shows a perspective front view of the filter.

The filter as shown in FIGS. 1 and 2 has a filter housing 1 with flanges 2a, 2b on both ends for installing the filter in a conduit, such as a cooling water supply conduit for a heat exchanger. The direction of flow of the fluid flowing through the filter, in particular cooling water, is indicated with an arrow A.

If not specially mentioned, the material of the components of the filter corresponds to a material which a person skilled in the art of developing and designing filters for fluids, or for electric motors (with special reference to drum motors) finds suitable.

A drum motor 3 with a rotary drum 4 is arranged in a coaxial position within filter housing 1 by means of brackets 5a, 5b spaced from each other as shown. Brackets 5a, 5b are each of a tube piece 6a, 6b for receiving the ends 7a, 7b of drum motor 3 (c.f. FIG. 3) in an anti-twist manner. Radial struts 8 extend from each tube piece 6a, 6b, which are releasably attached to the inside of filter housing 1.

A filter basket 9 is attached on the side wall of drum 4 of drum motor 3 by means of a tube piece 10 in an anti-twist manner and secured against axial displacement, preferably in a releasable manner.

Radial separating webs 12 extend on a filter surface, such as a multi-part screen surface 11 of filter basket 9, from an annular outer wall 13 of filter basket 9 to tube piece 10 for forming a stable structure of filter basket 9. Between separating webs 12, there are segment-shaped filter chambers 14 for catching substances from the fluid flow. As shown in FIG. 2, the filter surface of each filter chamber 14 is of a curved screen sheet as a screen surface 11 between adjacent separating webs 12, in the present exemplary embodiment.

A flushing pipe piece 16 is arranged on the upstream side of filter basket 9 immediately adjacent to the open sides of filter chambers 14 in a stationary manner, releasably attached to the end of an angled pipe piece 17 passing through filter housing 1 and attached there, for forming a flush-out conduit. Flushing pipe piece 16, or its opening, covers the open side of filter chambers 14, the principle of which is well known from filter systems with a backflushing principle. On the inner side wall of filter housing 1, an annular conducting body 18 of metal or plastic material is fixedly mounted, which extends over the upstream edge of annular side wall 13 and causes the fluid flow to be conducted through filter basket 9 so that no dirt particles pass through the gap between side wall 13 and inner side wall of filter housing 1. Other types of seals are also possible.

Drum motor 3 in the present exemplary embodiment is well known in its basic structure, for example from WO 2005/051809 A1 ("Motorized Drum Roller with Fixed Ends"). Components of drum motor 3, such as a reduction gear box 19 between pinion 20 of electric motor 21 and inside toothing 22 of drum 4, and ends 7a, 7b, of drum motor 3 are configured for the use of drum motor 3 as a rotary drive of filter basket 9. The windings of stator 23 are connected to cable conduit 26. A rotor 24 has a rotor shaft 25 with pinion 20. Pinion 20 is in mesh with reduction gear box 19 for rotatably driving drum 4 via its inside toothing 22. Ends 7a and 7b of drum 4 have rotary bearings 27a, 27b and fluid-proof gaskets 28a, 28b. On the downstream side 7b an axial bearing 29 is provided for receiving the flow pressure. All components of drum motor 3 coming into contact with the fluid are of seawater-proof stainless steel, for example, such as 1.4462 or 1.4439.

If a predefined limit for the amount of dirt in the filter has been reached by the deposition of substances, such as dirt particles in the filter chambers 14, a backflushing process begins. For this purpose, pipe piece 17 is opened so that, via flushing pipe piece 16, a suction is applied to that filter chamber 14, which faces flushing pipe piece 16 and is closed off by it in a pressure-free manner. At the same time drum motor 3 is activated for removing the deposits from filter chamber 14, and which turns filter basket 9 now to such an extent that flushing pipe piece 16 covers the next filter chamber 14, so that the deposits can also be removed from that filter chamber 14 by means of backflushing. In this manner the filter chambers 14 are sequentially cleaned. The control of drum motor 3 as a rotary drive of filter basket 9 depends on each desired mode of operation, which is determined according to known criteria.

The invention claimed is:

1. A filter for liquids in conduits, comprising
   a tubular filter housing (1),
   a filter basket (9) coaxially arranged within the filter housing (1) and arranged to be rotatable, and
   a stationary flushing pipe piece (16) for removing substances retained on the filter basket (9), said stationary flushing pipe piece (16) being formed to cover a portion of the filter basket (9) and being connected to an outlet for discharging said substances, wherein
   a liquid-proof drum motor (3) having a drum (4) is coaxially arranged within the filter housing (1), and wherein the filter basket (9) is attached to the drum (4).

2. The filter according to claim 1, wherein the system comprising the filter basket (9) and the flushing pipe piece (16) is configured in such a way that dirt or cleaning bodies are the substances which are primarily retained and removed by the filter.

3. The filter according to claim 1, wherein the filter basket (9) is attached to the drum (4) by radial struts extending between an annular outer wall (13) of the filter basket (9) and a tube piece (10) which is attached to the side wall of the drum (4).

4. The filter according to claim 1, wherein ends (7a, 7b) of the drum motor (3) are fixed in fixtures (5a, 5b), which are connected with the filter housing (1) by radial struts (8) in a fixed manner.

5. The filter according to claim 1, wherein the filter basket comprises a plurality of filter elements fixed to the drum (4) of the drum motor (3), or a number of filter elements, such as filter candles.

6. The filter according to claim 1, wherein separating webs (12) extend on a filter surface of the filter basket (9) from an annular outer wall (13) of the filter basket (9) radially toward an inside and form filter chambers (14) with screen surfaces (11), and wherein, for removing caught substances from the filter chambers (14), a suction can be applied from the flushing pipe piece (16) via a flush-out conduit formed as a pipe piece (17) to each filter chamber (14) currently facing the flushing pipe piece (16).

7. The filter according to claim 6, wherein the flushing pipe piece (16) is configured in such a way that it covers an opening of a filter chamber (14) facing the flushing pipe piece (16).

8. The filter according to claim 3, wherein the radial struts for attaching the filter basket (9) on the drum (4) are configured as separating webs (12) for forming filter chambers (14).

9. The filter according to claim 1, wherein the drum motor (3) has liquid-proof seals (28a, 28b) at its ends (7a, 7b).

10. The filter according to claim 1, wherein the drum motor (3) has fixed ends (7a, 7b) and an axial bearing (29) between the drum (4) and at least one of the fixed ends (7a, 7b).

11. The filter according to claim 1, further comprising a control of the drum motor (3) for reversing a sense of rotation of the drum motor (3) and the filter basket (9) if the rotation of the filter basket (9) is blocked by an obstruction in one sense of rotation.

12. The filter according to claim 1, wherein the filter basket (9) is rotatable relative to the filter housing (1), and the flushing pipe piece (16) is stationary relative to the filter housing, whereby rotation of the filter basket (9) sequentially brings different portions of the filter basket (9) into alignment with the flushing pipe piece (16).

* * * * *